(12) United States Patent
Gupta et al.

(10) Patent No.: US 11,264,802 B2
(45) Date of Patent: Mar. 1, 2022

(54) RELATING TO REACTIVE POWER CONTROL IN WIND POWER PLANTS

(71) Applicant: VESTAS WIND SYSTEMS A/S, Aarhus N (DK)

(72) Inventors: Manoj Gupta, Singapore (SG); Janakiraman Sivasankaran, Singapore (SG); Anoop Vijay Tiwari, Singapore (SG)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 16/638,670

(22) PCT Filed: Jul. 5, 2018

(86) PCT No.: PCT/DK2018/050177
§ 371 (c)(1),
(2) Date: Feb. 12, 2020

(87) PCT Pub. No.: WO2019/034215
PCT Pub. Date: Feb. 21, 2019

(65) Prior Publication Data
US 2021/0184462 A1  Jun. 17, 2021

(30) Foreign Application Priority Data
Aug. 15, 2017 (DK) .............................. PA201770617

(51) Int. Cl.
*H02J 3/18* (2006.01)
*H02J 3/38* (2006.01)
*F03D 7/04* (2006.01)

(52) U.S. Cl.
CPC ................ *H02J 3/18* (2013.01); *F03D 7/048* (2013.01); *H02J 3/381* (2013.01);
(Continued)

(58) Field of Classification Search
CPC ........ H02J 3/386; H02J 2300/28; H02J 3/381; H02J 3/16; H02J 3/18; H02J 3/383; Y02E 40/30; F03D 7/048; F03D 7/028
See application file for complete search history.

(56) References Cited

U.S. PATENT DOCUMENTS

| 8,680,720 B2 * | 3/2014 | Schauder ................ H02M 1/42 307/140 |
| 2008/0150283 A1 | 6/2008 | Rivas et al. |

(Continued)

FOREIGN PATENT DOCUMENTS

| EP | 2933478 A1 | 10/2015 |
| WO | 2009083445 A1 | 7/2009 |

(Continued)

OTHER PUBLICATIONS

PCT Notification of Transmittal of The International Search Report and The Written Opinion of the International Searching Authority, or the Declaration for Application No. PCT/DK2018/050177 dated Sep. 10, 2018.

(Continued)

*Primary Examiner* — Ryan Johnson
(74) *Attorney, Agent, or Firm* — Patterson + Sheridan, LLP (57) ABSTRACT

A method for controlling a renewable energy power plant comprising a plurality of renewable energy generators, the method comprising: carrying out the following steps dynamically: determining a reactive power capability value of the power plant based on the generated active power of each of the renewable energy generators within the power plant; determining a reactive power exchange limit value based on a measured grid voltage level; and controlling the power plant so that the generated reactive power does not exceed the lower of the determined reactive power capabil- (Continued)

ity value and the determined reactive power exchange limit value that are determined dynamically.

20 Claims, 10 Drawing Sheets

(52) U.S. Cl.
CPC ....... *H02J 2300/20* (2020.01); *H02J 2300/24* (2020.01); *H02J 2300/28* (2020.01); *Y02E 40/30* (2013.01)

(56) References Cited

U.S. PATENT DOCUMENTS

2009/0218817 A1\* 9/2009 Cardinal ................. F03D 7/048
290/44
2013/0234523 A1\* 9/2013 Anichkov ............. H02J 3/1835
307/82
2015/0337808 A1 11/2015 Kang et al.
2016/0313716 A1\* 10/2016 Chen ....................... H02J 3/381

FOREIGN PATENT DOCUMENTS

| WO | 2015086021 A1 | 6/2015 |
|----|---------------|--------|
| WO | 2016034178 A1 | 3/2016 |
| WO | 2016070882 A1 | 5/2016 |
| WO | 2019034215 A1 | 2/2019 |

OTHER PUBLICATIONS

PCT Written Opinion of the International Searching Authority for PCT/DK2018/050177 dated Sep. 10, 2018.
Danish Patent and Trademark Office First Technical Examination for PA 2017 70617 dated Mar. 14, 2018.

\* cited by examiner

RELATING TO REACTIVE POWER CONTROL IN WIND POWER PLANTS

TECHNICAL FIELD

The present invention relates to a method of controlling a renewable energy power plant, a renewable energy power plant controller, and to a wind turbine power plant and to renewable energy power plants more generally.

BACKGROUND

It is now expected that newly commissioned wind power plants and other forms of renewable energy are able to regulate the power that they provide to a grid. A wind power plant comprises a plurality of wind turbine generators and is also known as a wind park or a wind farm. The regulation and general operation of the power plant is controlled by a power plant control system or controller (PPC), which implements operational limits and requirements as set out by a Transmission System Operator (ISO) or in country-specific grid interconnection requirements or 'grid codes'. The TSO also communicates power delivery demands to the PPC.

Grid codes commonly include specific restrictions on reactive power exchange at a Point of Interconnection (PoI) between the grid and the power plant. While restricting the reactive power exchange of wind power plants is beneficial to both the power plant and the grid, there are some situations in which excess reactive power exchange is required. For example, to participate in an ancillary services market, it is desirable for reactive power exchange to be controllable above the levels required by the grid. Similarly, during a fault, it is preferable to be able to generate excess reactive power in support of the grid, thereby reducing the likelihood of disconnection of the wind power plant.

To generate excess reactive power, the wind power plant must be operated outside the limits that have been designed to ensure stability of the grid under normal operation. Increasing reactive power exchange may result in instability of the grid or other unsafe conditions if not managed appropriately. There are currently no known provisions to allow safe reactive power exchange between a wind power plant and a grid above the requirements of the grid code or TSO.

It is an aim of the present invention to address disadvantages associated with the prior art.

SUMMARY OF THE INVENTION

According to one aspect the invention provides a method for controlling a renewable energy power plant comprising a plurality of renewable energy generators, the method comprising: carrying out the following steps dynamically; determining a reactive power capability value of the power plant based on the generated active power of each of the renewable energy generators within the power plant; determining a reactive power exchange limit value based on a measured grid voltage level; and controlling the power plant so that the generated reactive power does not exceed the lower of the determined reactive power capability value and the determined reactive power exchange limit value that are determined dynamically.

The ease of implementation of the method is particularly beneficial as it is able to be implemented within conventional power plants without additional instrumentation or adaptation.

Desirably, the method ensures that safe operation of the power plant is maintained while increasing the reactive power output beyond the levels that can ordinarily be achieved. This allows participation in ancillary markets, and improves the likelihood that the power plant will not be disconnected from a power transmission network during a fault.

In addition to the renewable energy generators, the power plant may comprise reactive power compensation equipment. Compensation equipment ensures that a quick reaction to changes in reactive power demand can be achieved.

The measured grid voltage may be associated with a point of interconnection between a power transmission network and the power plant.

The power transmission network may be a local, national or international grid network such as the National Grid of Great Britain, and a further advantage lies in that by specifying reactive power limits based upon voltage levels, interconnection requirements of the grid are more likely to be met.

The reactive power capability value of the power plant may be determined as the difference between an absolute reactive power capability value of the power plant and network losses associated with the power plant.

The absolute reactive power capability value of the power plant may be determined by reference to a P-Q data structure that specifies reactive power limit levels for predetermined active power measurements.

The P-Q data structure may be dynamically generated based on a real time measurement of voltage at the terminals of at least a respective one of the power generators of the power plant.

Network losses may be determined by generating a second-order polynomial equation based on the generated active power of the power plant.

Determining the reactive power exchange limit value may comprise determining a voltage level associated with the power transmission network and referring to a dynamically generated U-Q data structure to determine the reactive power exchange limit value. The U-Q data structure specifies reactive power limit levels for predetermined voltage levels.

Determining the reactive power exchange limit value may comprise determining an active power output level of the power plant and generating the U-Q data structure based on the determined active power output level.

The method may comprise receiving a global reactive power reference from a transmission system operator, comparing the reactive power reference with the lower of the determined reactive power capability value and the determined reactive power exchange limit value that are determined dynamically, and distributing individual reactive power references to each of the renewable energy generators.

Determining the reactive power exchange limit value may comprise identifying whether the global reactive power reference corresponds to absorption or supply of reactive power by the renewable energy power plant.

Similarly, determining the reactive power capability value may comprise identifying whether the global reactive power reference corresponds to absorption or supply of reactive power by the renewable energy power plant.

The dynamic calculation of reactive power capability and reactive power exchange limit values may be triggered by a request to participate in ancillary service provision to the grid.

According to another aspect of the present invention, there is provided a power plant controller for a power plant having a plurality of wind turbine generators and reactive power compensation equipment, wherein the controller comprises a processor, a memory module, and an input/output system, and wherein the memory includes a set of program code instructions which when executed by the processor, implement a method as described above.

The plurality of renewable energy generators may comprise wind turbine generators and/or photovoltaic generators.

According to another aspect of the present invention, there is provided a computer program product downloadable from a communication network and/or stored on a machine readable medium, comprising program code instructions for implementing a method as described above.

BRIEF DESCRIPTION OF THE DRAWINGS

One or more embodiments of the invention will now be described, by way of example only, with reference to the accompanying drawings, in which:

FIG. 2 is a schematic representation of the reactive power control modes that a wind power plant may be operated in;

DETAILED DESCRIPTION

Figure 1:
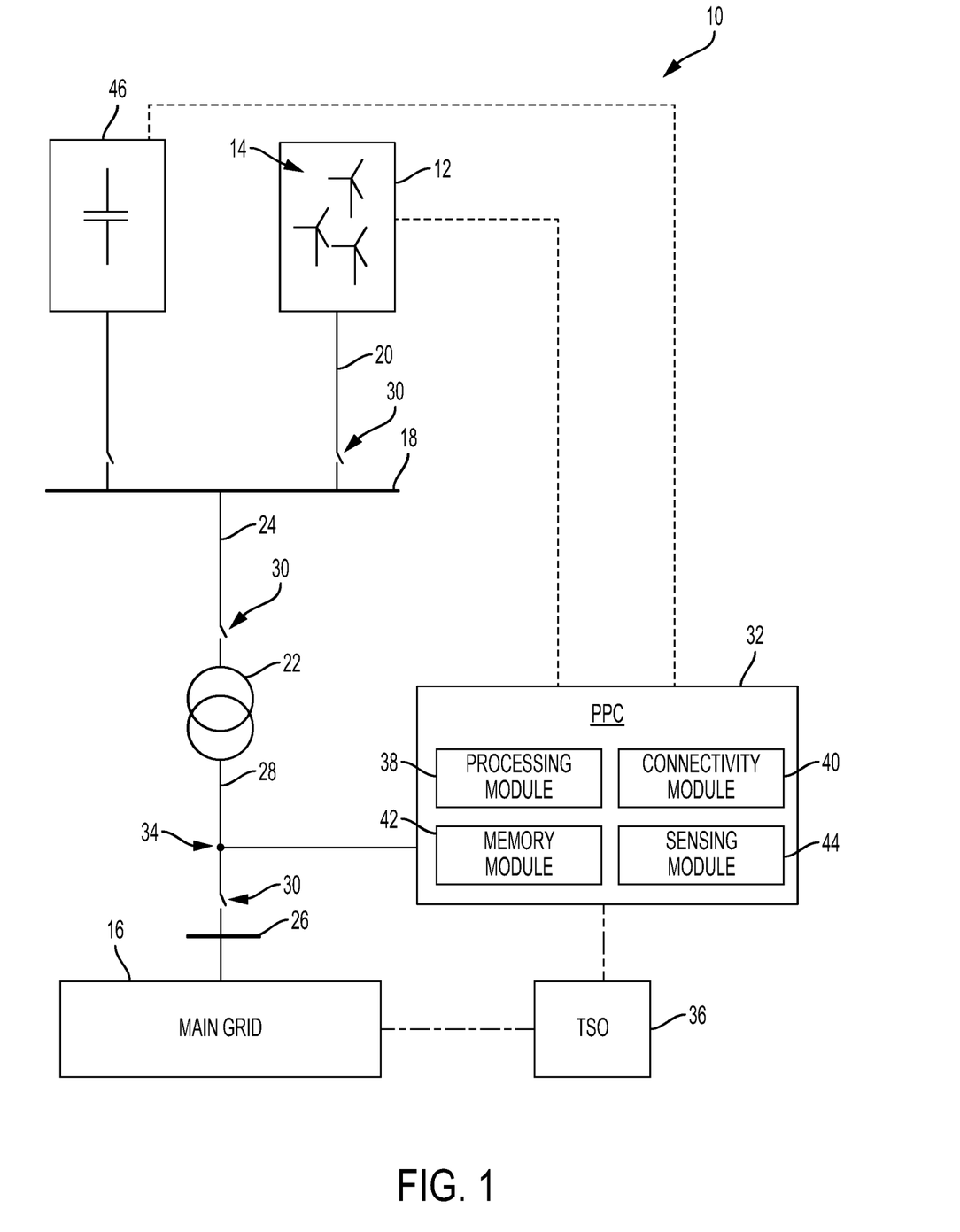
FIG. 1 is a schematic view of a power network including a wind power plant and a main grid according to an embodiment of the invention.

FIG. 1 illustrates a typical architecture in which a wind power plant (WPP) is connected to a main transmission grid as part of a wider power network. The example shown is representative only and the skilled reader will appreciate other specific architectures are possible, in relation to both wind power plants and power plants for other renewable energy sources. In addition, the skilled reader will appreciate that methods, systems and techniques also described below may be applicable to many different configurations of power network. Moreover, the components of the wind power plant and power network are conventional and as such would be familiar to the skilled reader.

In particular, it should be noted that a renewable energy power plant may comprise a wind power plant, such as that shown in FIG. 1, or may comprise a solar power plant. The concepts described herein are equally applicable to other renewable energy power plants that exploit other energy sources, such as bio energy or ocean/wave/tidal energy, for example. Furthermore, a renewable energy power plant is considered to comprise a plurality of renewable energy generators, which are the individual generational elements of the power plant and are configured to convert renewable energy sources into electrical energy for provision to an electrical transmission network. In a wind power plant, the renewable energy generators comprise wind turbine generators, while in a solar power plant, the generators comprise solar/photovoltaic energy generators.

FIG. 1 shows a power network 10 incorporating a wind power plant (WPP) 12 including a plurality of wind turbine generators (WTGs) 14 often more commonly called 'wind turbines'. A single WTG would also be possible. Each of the plurality of WTGs 14 converts wind energy into electrical energy, which is transferred from the WTGs 14 to a main transmission power network 16 or main grid, as active power, for distribution.

WTGs 14 generate both active power and reactive power. The main grid 16 often has reactive power requirements to support voltage changes, and the output of WTGs 14 can be changed to match these requirements in real time. Some reactive power requirements cannot be achieved by operation of WTGs 14 only, so compensation equipment 46 may be used to accommodate the shortfall. The current invention provides a method 100 and a system 10 that can provide extra reactive power when operating WTGs 14 at full active power output that reduces the reliance on compensation equipment 46.

Each of the WTGs 14 of the WPP 12 is connected to a local grid that links the WTGs 14 and the WPP 12 is suitably connected to a collector bus 18 via a feeder line 20. The collector bus 18 may be at an intermediate voltage level that is suitable for relatively short distance power transmission, for example in the region of 10 to 150 kV, most usually between 110 and 150 kV. The collector bus 18 may also provide a point of common coupling (PCC) for a plurality of wind power plants, although only a single WPP 12 is shown here for simplicity.

The collector bus 18 is connected to a main step-up transformer 22 by a transmission line 24. The main transformer 22 is in turn connected to the main grid 16 at a Point of Interconnection (PoI) 26 by another transmission line 28. The PoI 26 is an interface between the WPP 12 and the main grid 16.

While the collector bus 18 may be required to span distances up to around 100 km, the main grid 16 may be an international, national, or regional grid such as the National Grid of Great Britain, for example, and therefore may be required to span distances of up to around 250 km or more. Accordingly, the voltage level of the main grid 16 may be much higher than the voltage level of the collector bus 18 for better transmission efficiency.

The connecting lines such as the transmission and feeder lines 20, 24, 28 may each include a protection system 30 to protect individual components from damage during or following extreme conditions. For example, it is envisaged that at least an appropriate circuit breaker will be included in each line.

Hereinafter, it should be assumed that references to components being connected or connections between components comprise suitable feeder or transmission lines as described above unless it is otherwise indicated.

A Power Plant Controller (PPC) 32 is connected to the power network 10 at a Point of Measurement (PoM) 34 and is also connected directly to the WPP 12. The role of the PPC 32 is to act as a command and control interface between the WPP 12 and a grid operator or transmission system operator (TSO) 36. The ISO 36 is responsible for indicating the needs and requirements of the main grid 16 to the PPC 32. The PPC 32, in its role as command and control interface, interprets the power delivery demands requested of it by the TSO 36 and manages the WTGs 14 in the WPP 12 in order to satisfy those requirements, whilst taking into account other operative factors such as grid faults and sudden changes in output or measured grid voltage.

The PPC 32 is a suitable computer system for carrying out the controls and commands as described above and so incorporates a processing module 38, a connectivity module 40, a memory module 42 and a sensing module 44.

In order to monitor and regulate the output of the WPP 12 and to interpret the power demands correctly, the PPC 32 is connected to the transmission line 28 between the main transformer 22 and the PoI 26 at the PoM 34. The PPC 32 is equipped to measure a variety of parameters including a representative power output that will be supplied to the main grid 16 at the PoI 26 by the WPP 12. As the PoM 34 is not at the PoI 26, the measured parameters are only representative as losses in the lines between the PoM 34 and PoI 26, and between the PoM 34 and the PPC 32, may have an effect on the measurements. Suitable compensation may take place to account for the losses to ensure that the measurements are accurate.

In addition, the PPC 32 measures parameters of the power output such as a frequency and voltage, as well as reactive power exchange between the WPP 12 and the main grid 16 and the voltage level of the main grid 16. The PPC 32 compares the measured parameters against specific grid requirements and communicates control commands to specific components of the WPP 12 accordingly. The WPP 12 is capable of altering its reactive power output in reaction to commands received from the PPC 32.

To ensure a greater level of control over reactive power exchange, a reactive power compensator 46 such as a Static Synchronous Compensator (STATCOM) or Static VAR Compensator (SVC) is incorporated into the WPP 12 and connects to the collector bus 18 in parallel to the plurality of WTGs 14. The compensator 46 is configured to provide reactive power compensation when required, such as when instructions are received from the PPC 32 according to a control strategy.

The PPC 32 communicates control commands to both the compensator 46 and to the WTGs 14 in a suitable manner. It will be noted that FIG. 1 is a schematic view, so the way in which the control commands are transferred to the compensator 46 and/or the WTGs 14 is not depicted explicitly. However, it will be appreciated that suitable cabling may be provided to interconnect the PPC 32 and the compensator 46 and/or WTGs 14. The interconnections may be direct or 'point to point' connections, or may be part of a local area network (LAN) operated under a suitable protocol (CAN-bus or Ethernet for example). Also, it should be appreciated that rather than using cabling, the control commands may be transmitted wirelessly over a suitable wireless network, for example operating under WiFi™ or ZigBee™ standards (IEEE802.11 and 802.15.4 respectively).

The diagram of FIG. 1 should be taken as a representation of a power network only. Alternative configurations of power network and power plants are known and it is expected that other known components may be incorporated in addition to or as alternatives to the components shown and described in FIG. 1. Such changes would be within the capabilities of the skilled person. For example, substations or extra transformers would be expected to be incorporated in the wind power plant depending upon the number of WTGs included in the plurality of WTGs.

In some embodiments, the PoM 34 may be positioned at a different position in the system such that the parameters measured by the PPC 32 are not representative of the actual values for those parameters at the PoI 26 and the values may differ by an order of magnitude or more. In this case, a correction factor may be applied to the measurements to adjust for the different position of the PoM 34 relative to the PoI 26. It therefore does not matter where the PoM 34 with regard to the PoI 26, so long as there is a predetermined correction factor. Therefore, the measured voltage may be indicative of, or associated with, the voltage at the PoI 26, even if the voltage is not measured directly at that location.

To be able to supply power to the main grid 16, the WPP 12 must comply with a set of grid requirements specific to the main grid 16. As described above, the PPC 32 communicates control commands to alter the power output and active and reactive power exchange at the PoI 26.

One functional aspect of the PPC 32 is to control reactive power exchange to reduce the likelihood of disconnection from the grid 16, and thereby to maintain grid stability.

Grid requirements outline reactive power exchange limits with respect to active power output and to voltage variations.

Figure 2:
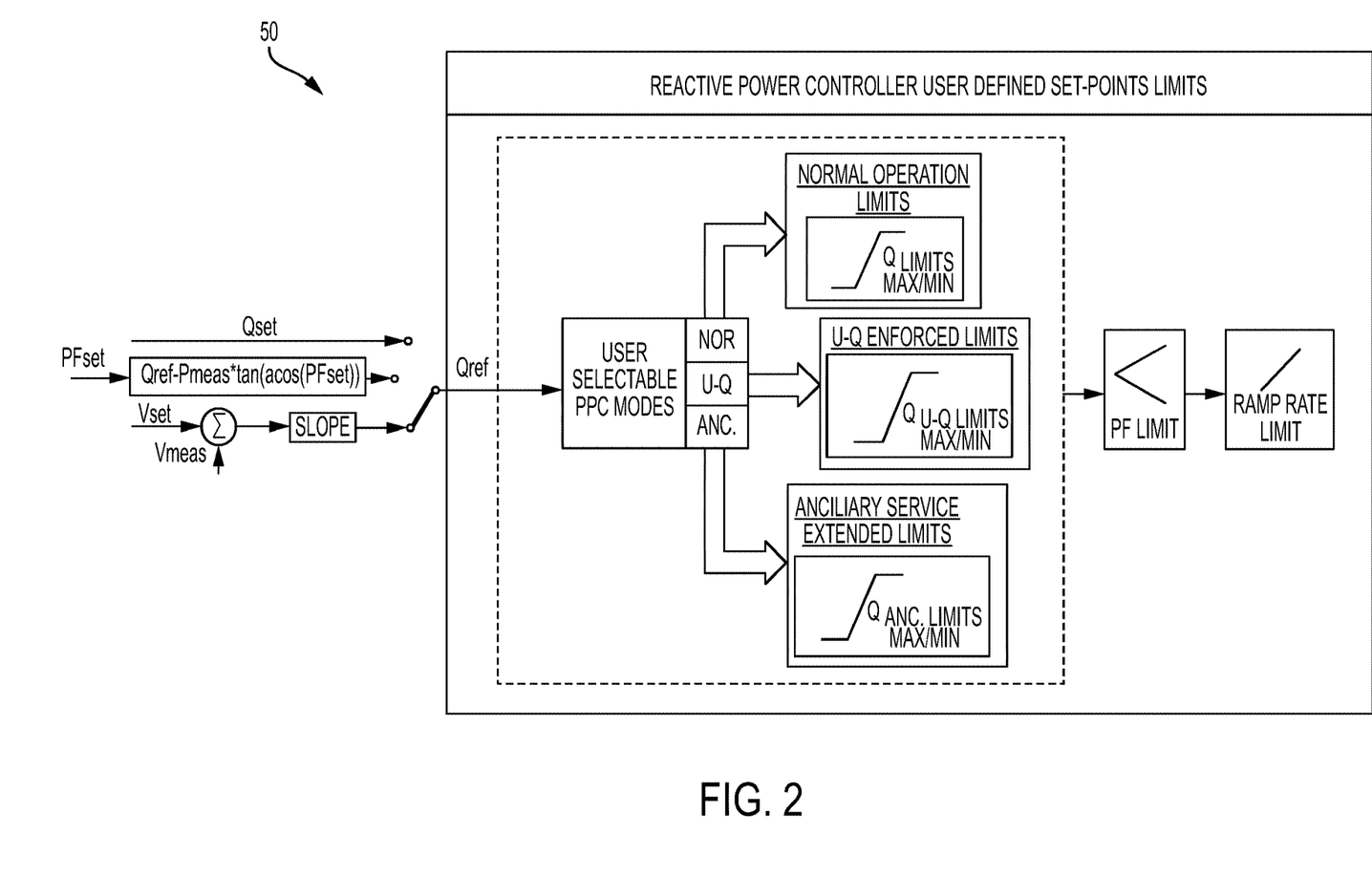

To control reactive power exchange, the PPC 32 operates and is configured to operate the WPP 12 in one of a plurality of modes to meet grid requirements or requirements specified by the TSO, as shown in the flow chart 50 FIG. 2. The modes in which the WPP 12 may be operated are as follows:
  normal mode (NOR):
  U-Q mode (U-Q), and
  ancillary mode (ANC).

Figure 3:
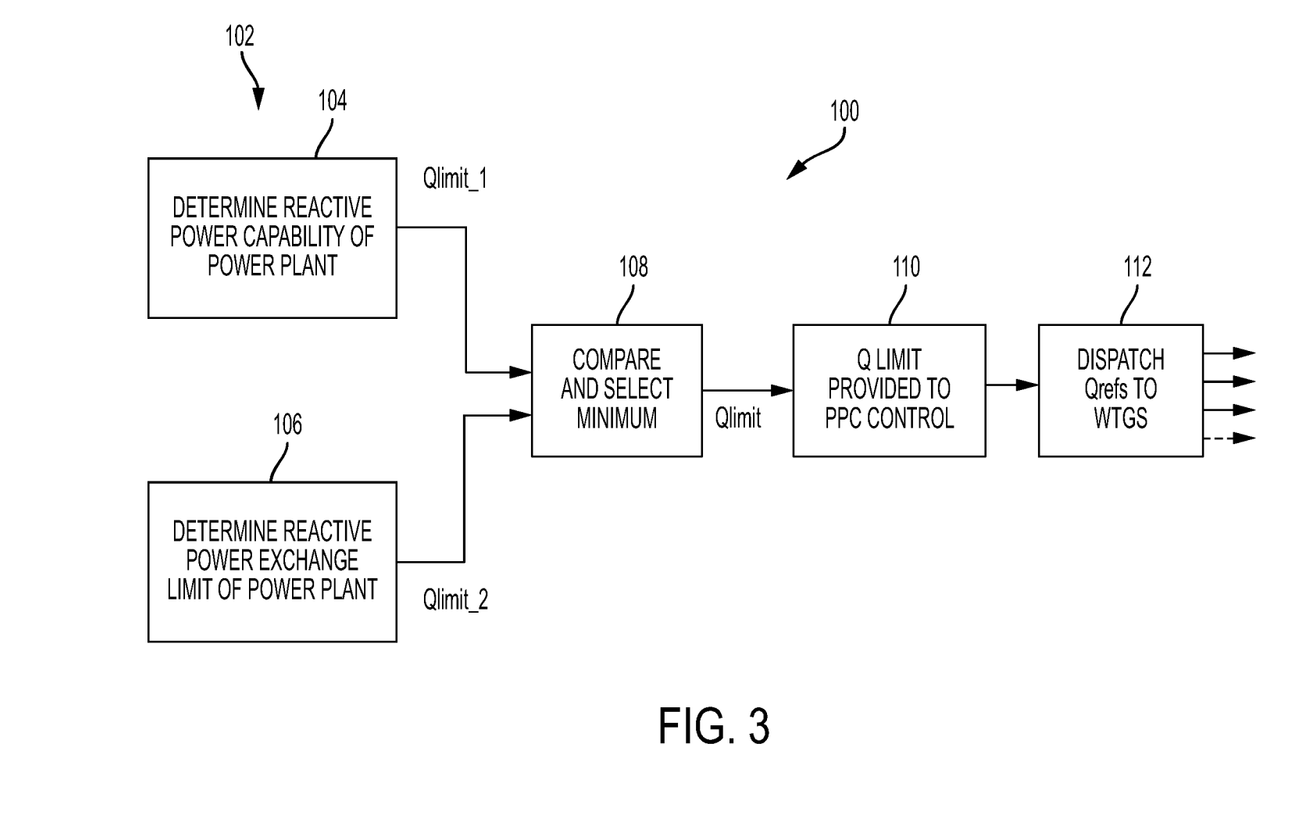
FIG. 3 is a flow chart illustrating a process governing the setting of reactive power limits for a wind power plant by a power plant controller according to an embodiment of the present invention.
Figure 4:
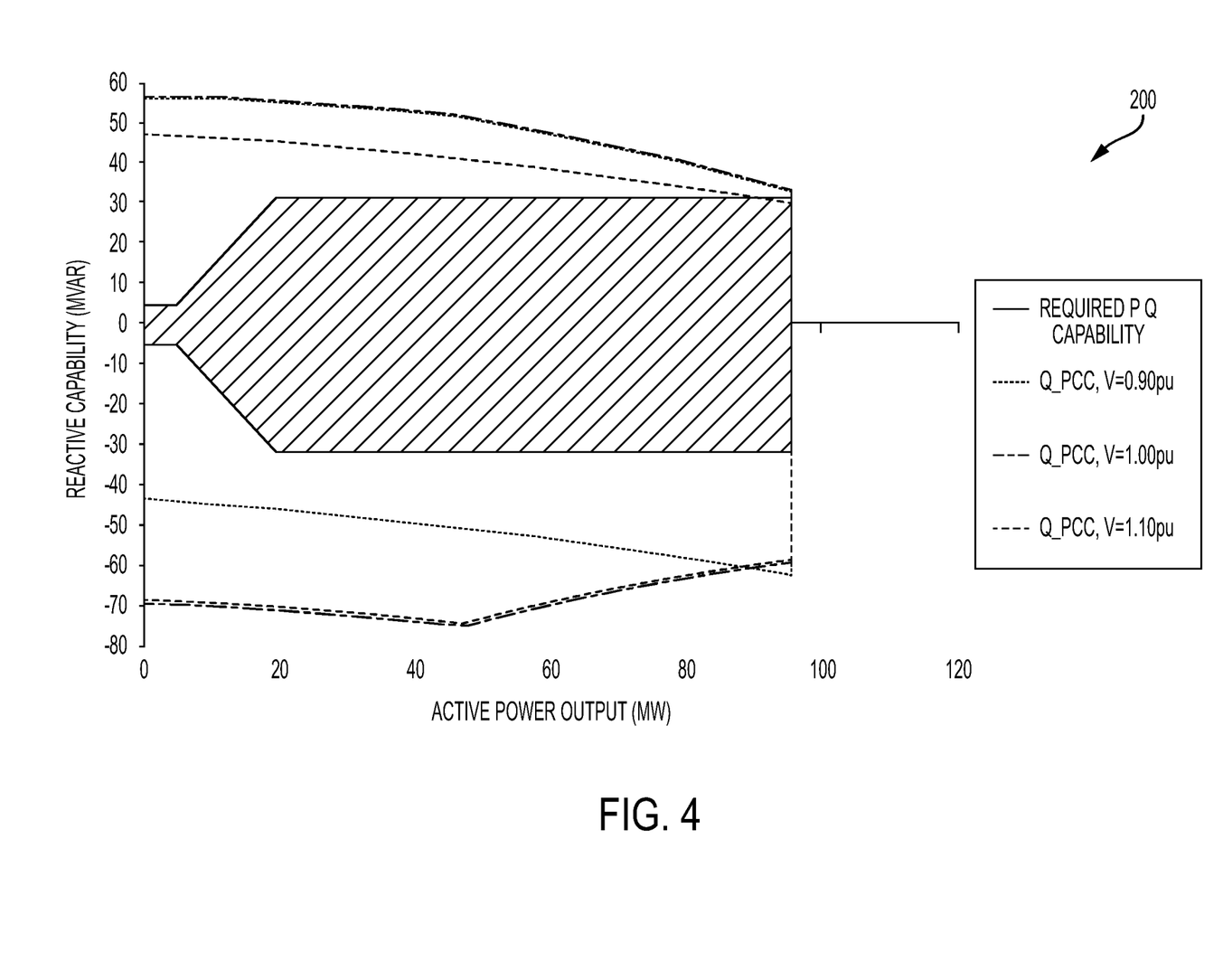
FIG. 4 is a chart outlining reactive power limits as implemented by a power plant controller in conventional control modes and in control modes according to embodiments of the present invention.

In the normal mode, reactive power limits are based on grid requirements that specify a relationship between the active power output and the reactive power output. In the U-Q mode, reactive power limits are based on grid requirements specifying the reactive power level relative to voltage level at the PoI 26. The present invention concerns the ancillary mode of FIG. 2. FIG. 3 shows a flow chart illustrating a method 100 that governs the operation of the PPC 32 and WPP 12 in the ancillary mode, or ancillary reactive power control mode according to an embodiment of the invention.

The ancillary reactive power control mode is implemented by the PPC 32 to meet an additional reactive power exchange request or to allow support of ancillary services or the ancillary power market by the main grid 16. The ancillary reactive power mode allows the WPP 12 to provide improved reactive power exchange above that which would be allowed by conventional control modes whose reactive power limits are static and based on predetermined grid requirements, while retaining WPP 12 operation within a terminal voltage between 0.9 per unit ('pu') and 1.1 pu. Provision of an ancillary reactive power mode results in a superior system that is less likely to be prioritised for disconnection from the main grid 16 in the event of a fault.

Moreover, it provides a higher flexibility in the choice of mode available for operation of the WPP 14 and PPC 32, while not requiring additional hardware for its implementation, as is explained below.

The ancillary reactive power mode will now be explained with reference to FIGS. 1 to 10. Referring initially to FIG. 3, it can be seen at the first step 102 of the method 100, the PPC 32 is configured to determine 104 the dynamic reactive power capability, or 'P-Q capability', of the WPP, for example by generating an active power-reactive power, or 'P-Q', data structure or chart or otherwise, and to determine 106 the dynamic reactive power exchange limit at the PoI 26, for example by generating a voltage-reactive power, or 'U-Q' chart or otherwise. These values are subsequently compared 108, and the minimum of the two values is selected. The minimum value is provided 110 to the PPC 32 as a reactive power limit level, and this value is subsequently dispatched 112 to the WTGs 14 of the WPP 12 to ensure correct operation. The 'P-Q' and 'U-Q' charts are considered to specify reactive power limit levels for predetermined active power or voltage levels. The term 'predetermined' as used herein refers to values and/or parameters that have been determined either through calculation or empirical methods and then stored for later reference.

In other words, the method may be considered to comprise dynamically carrying out a determination of a reactive power capability value and determination of a reactive power exchange limit value and controlling the WPP so that generated reactive power does not exceed the lower of the two determined values. The control of the WPP is implemented in the form of reference reactive power values calculated for each individual WTG, and distributed by the PPC to each WTG. The PPC may take into account a request from the TSO when distributing these references, and in particular a global reference value communicated to the PPC by the TSO.

As used herein, the term dynamic is used to indicate that the calculation of the capability value or limit value is performed in real time as soon as suitable measurements are performed, thus providing values that are dependent upon the instantaneous operation of the system for which they are calculated.

The operation of the WPP 12 in this mode by the PPC 32 results in an improvement in the available reactive power output level from the WPP 12 to the grid 16. This is demonstrated by the chart 200 shown in FIG. 4, The central, hatched region in this chart indicates the reactive power output limit levels specified by the PPC 32 when operating the WPP 12 in normal modes as dictated by grid-level requirements. The three areas bounded by the other lines indicate the potential reactive power output levels for 0.9 pu, 1.0 pu and 1.1 pu voltage respectively, when the WPP 12 is operated in ancillary reactive power mode.

As would be understood by the skilled person, per-unit voltage is an expression of the voltage with respect to a base value which is used as a reference. Using a per-unit system allows for normalization of values across transformers and other components that may change the value by an order of magnitude.

Figure 5:
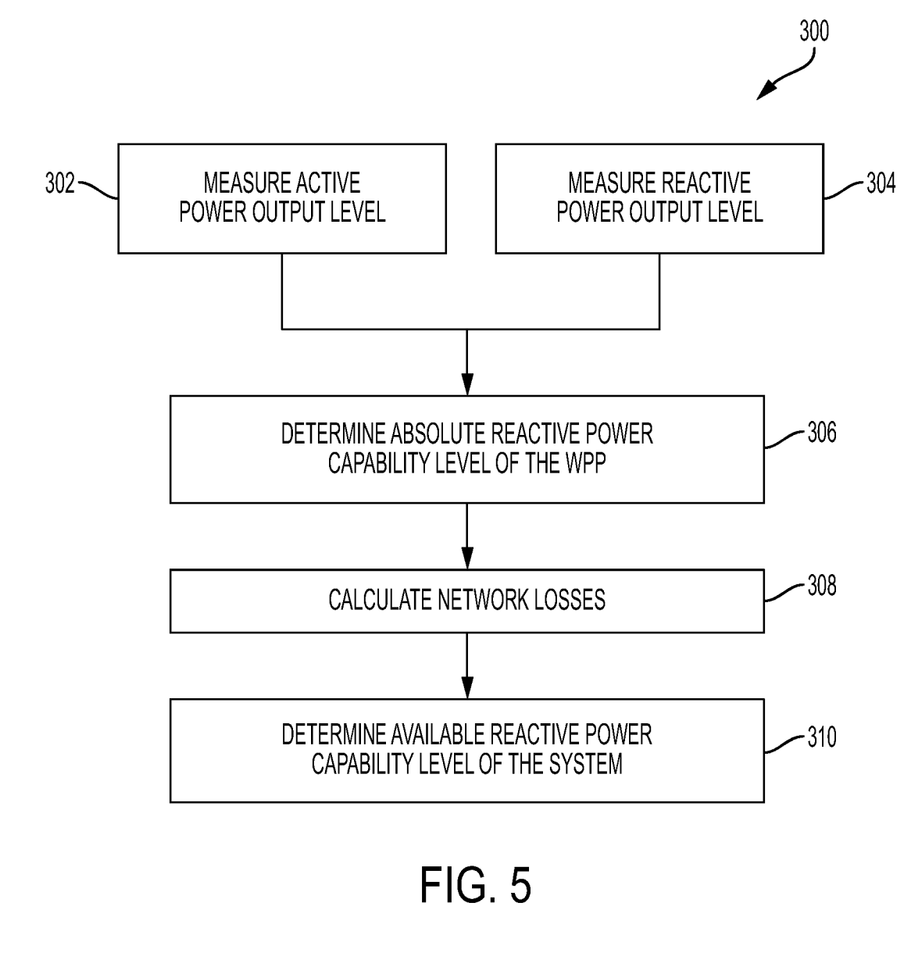
FIG. 5 is a flow chart illustrating a process governing the determination of an actual reactive power capability of a wind power plant by a power plant controller.
Figure 9:
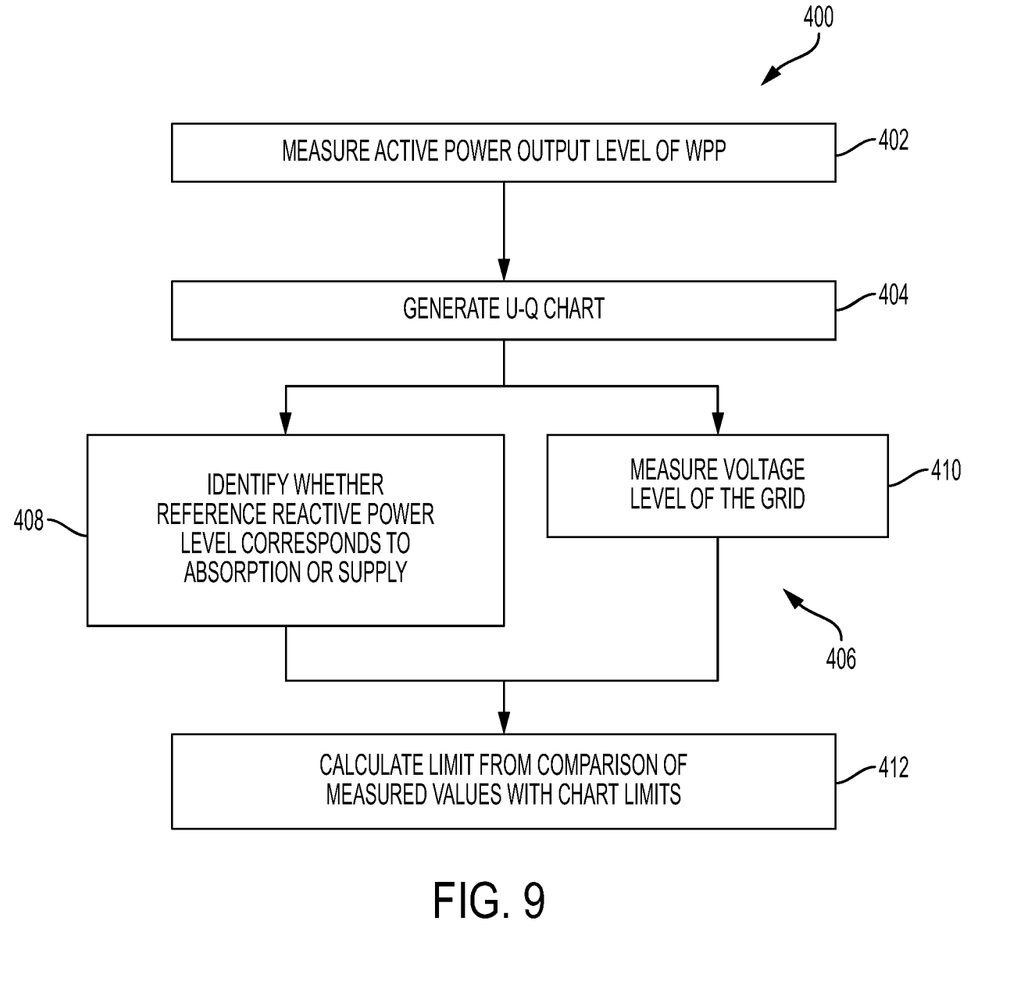
FIG. 9 is a flow chart illustrating a process governing the determination of a reactive power exchange limit of a wind power plant by a power plant controller.

Each of the steps of the method 100 of FIG. 3 will now be considered individually Firstly, considering step 102, a flow chart illustrating a method 300 governing the determination 104 of reactive power capability of the WPP 12 is shown in FIG. 5 and similarly, a flow chart illustrating a method 400 governing the determination 106 of reactive power exchange limit at the PoI 26 is shown in FIG. 9.

Initially, in the method 300 governing determination 104 of reactive power capability, a flow chart for which is shown in FIG. 5, the active power output level is measured 302 and the reactive power output level of the WPP 12 is measured 304. Both values are measured at the PoI 26.

Having measured 302, 304 the active and reactive power output levels at the PoI 26, the next step of the method 300 is to determine 306 the absolute reactive power capability level of the WPP 12 for the output levels measured 302, 304 in the previous step. The determined absolute reactive power capability level is the maximum reactive power level that the WPP 12 is able to absorb or provide, when losses in the system are not taken into account. The absolute reactive power capability levels can be considered to represent reactive power limit levels that each WTG 14 of the WPP 12 should not exceed during normal operation.

The absolute reactive power capability level is determined 306 for the measured active and reactive power output levels, and is derived, or adapted, from P-Q capability the WTG terminals. For example, the P-Q capability of the WTG terminals may be calculated by measuring voltage across each of the terminals, or may be provided by an internal controller of each WTG that is capable of applying a mathematical model to identify its current capability above that which it is currently providing. The use of per unit measurements facilitates this transfer of capabilities between WTG terminal capabilities and PoI capabilities.

The determination of the absolute reactive power capability level may also comprise identifying a reference reactive power level supplied to the PPC by the TSO corresponds to a request for absorption of reactive power from the grid or supply of reactive power to the grid by the WPP.

It will also be appreciated that the capabilities differ for different WTG types. Therefore, capability at the PoI 26 also differs for WPPs 12 comprising each of the different WTG types, as will be explained in due course with reference to FIGS. 6 and 7.

Following the determination 306 of the absolute reactive power capability of the WPP 12, the method 300 of FIG. 5 moves on to the next step which comprises calculating 308 the losses introduced by into the system 10 by the components disposed between the WPP 12 and the PoI 26. These components may be referred to as the 'collector network', and includes the collector bus 18, transmission lines 20, 24, 28 and transformers 22 that may have an associated reactive power requirement.

Having determined 306 the absolute capability and having calculated 308 the losses introduced within the system 10, the actual reactive power capability is determined 310. The actual capability is the difference between the absolute capability and the losses.

Each of the steps 306 to 310 of the method 300 shown in FIG. 5 will now be considered in more detail.

Figure 6:
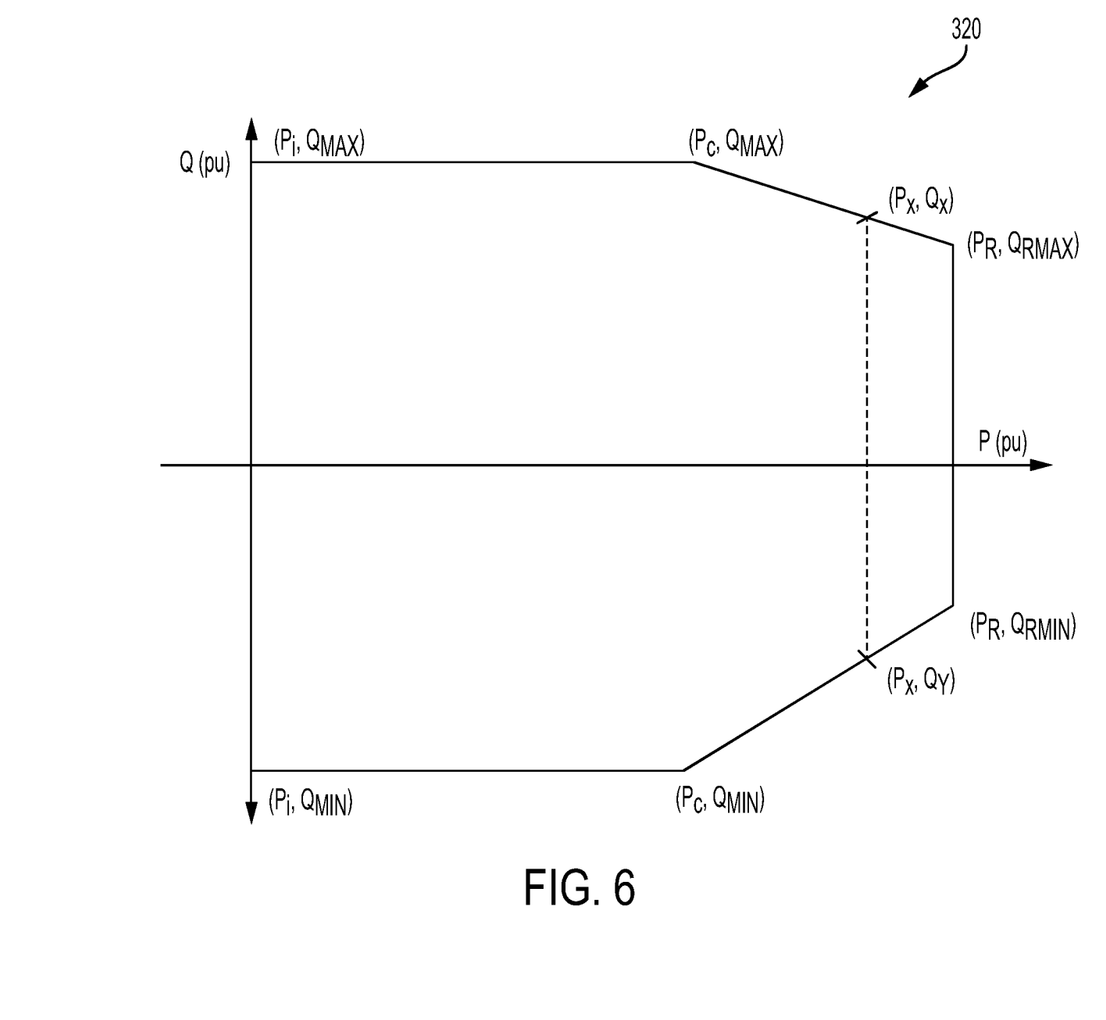
FIG. 6 is a chart outlining the dynamic relationship between active power levels and reactive power exchange limits for Type 4 wind turbine generators according to an embodiment of the invention.
Figure 7:
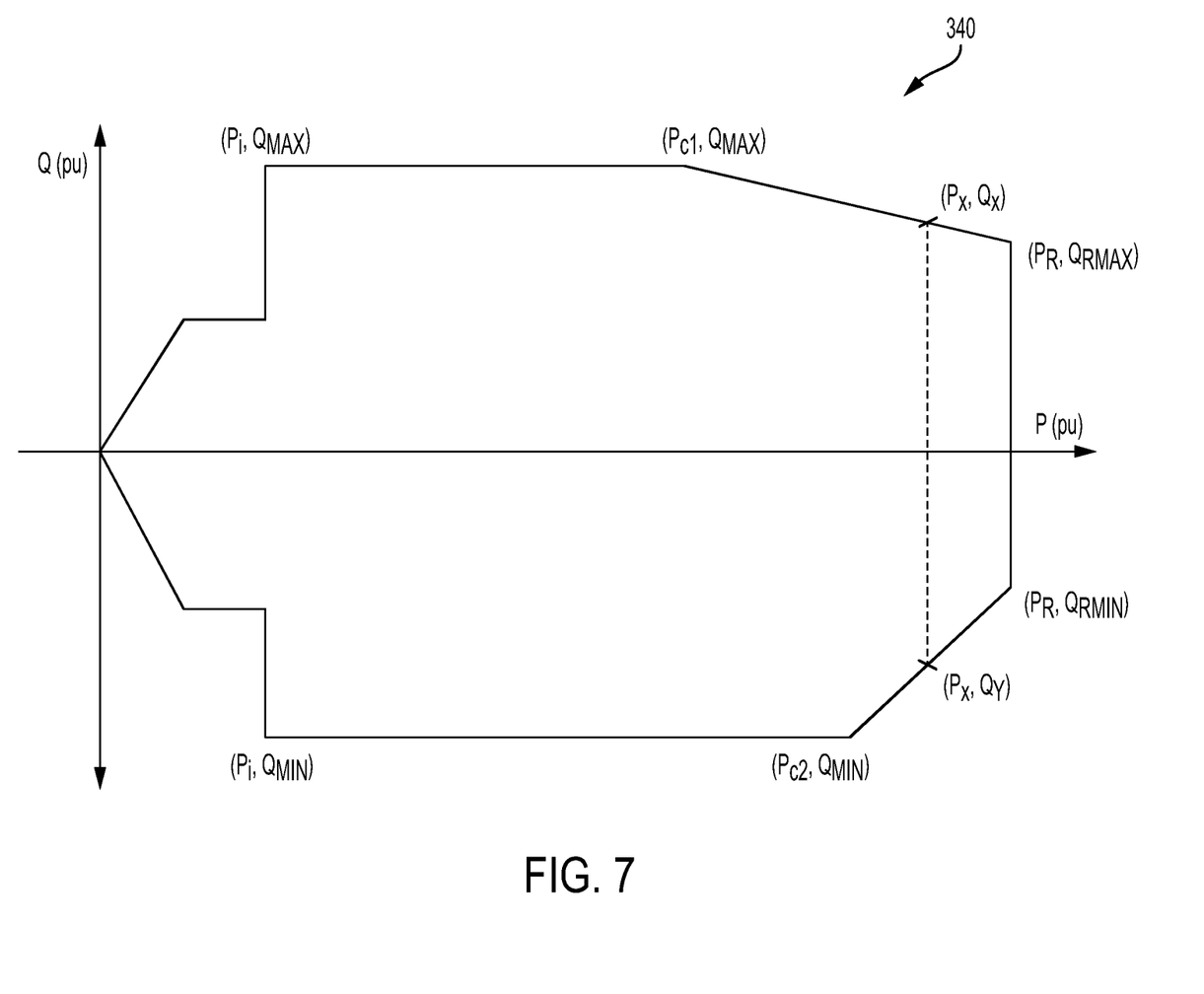
FIG. 7 is a chart outlining the dynamic relationship between active power levels and reactive power exchange limits for Type 3 wind turbine generators according to an embodiment of the invention.

Initially considering step 306, in which the absolute capability of the WPP 12 at the PoI 26 is determined, curves determined for the absolute capability of two different WPPs 12 are shown in FIGS. 6 and 7. FIGS. 6 and 7 show charts 320, 340 illustrating relationships between the reactive power capability levels (Q), shown on the y axis and active power (P), shown on the x axis. FIG. 6 is a chart 320 illustrating this relationship measured at the PoI 26 derived from requirements of the grid code for Type 4 WTGs, while FIG. 7 is a chart 340 illustrating this relationship measured at the PoI 26 and derived from terminal capabilities for Type 3 WTGs.

As would be understood by the skilled person, Type 3 WTGs are commonly referred to as "Doubly Fed Induction Generators" or "Double Fed Asynchronous Generators", while Type 4 WTGs incorporate full-scale back-to-back frequency converters to allow flexibility in the operation. Both Type 3 and Type 4 WTGs are operable to perform reactive power control.

The line ('A') extending from the intersection of the y and x axes on both of FIGS. 6 and 7 corresponds to no net reactive power exchange. A reactive power level above this line indicates the level of reactive power that is being supplied to the main grid 16 by the WPP 12. A reactive power level below this line indicates the level of reactive power that is absorbed from the main grid 16 by the WPP 12.

If, in step 302, the active power output level, $P_X$, is measured to be above a lower bound, $P_i$, but below a middle bound, Pc, the maximum absolute reactive power capability is the maximum reactive power level that the WPP 12 is capable of supplying, $Q_{MAX}$. Similarly, the minimum absolute reactive power capability between these bounds is the maximum reactive power level that the WPP 12 is capable of absorbing, $Q_{MIN}$. These capabilities are the same for WPPs 12 comprising Type 4 and Type 3 WTGs. As the reactive power output level has also been measured 304 in a previous step, it can be determined which of $Q_{MAX}$ or $Q_{MIN}$ is most relevant. If the reactive power output level as measured 304 in the previous step indicates that the WPP 12 is supplying reactive power, the $Q_{MAX}$ limit is chosen, while if it is indicated that the WPP 12 is absorbing reactive power, $Q_{MIN}$ is most appropriate.

If the active power output level, $P_X$, is measured 304 to be between the middle bound, Pc, and an upper bound, $P_R$, the absolute reactive power capabilities differ depending upon the type of WTGs 14 that form the WPP 12. For a WPP comprising Type 4 WTGs, the chart 320 in FIG. 6 applies, and the maximum and minimum absolute capabilities, $Q_{absoluteMAX}$ and $Q_{absoluteMIN}$, are calculated using the following calculations:

$$Q_{absoluteMAX} = \left([P_X - P_C]\frac{Q_{RMAX} - Q_{MAX}}{P_R - P_C}\right) + Q_{MAX}$$

$$Q_{absoluteMIN} = \left([P_X - P_C]\frac{Q_{RMIN} - Q_{MIN}}{P_R - P_C}\right) + Q_{MIN}$$

where $Q_{RMAX}$ and $Q_{RMIN}$ are the maximum reactive power levels that the WPP is capable of absorbing and supplying respectively when each WTG of the WPP is operating at maximum active power output. These values are predetermined by the WTG manufacturer or by the grid code requirements. Alternatively, these values may be set by the PPC 32 or WTGs 14 themselves.

For a WPP comprising Type 3 WTGs, the chart 340 in FIG. 7 applies, and two middle bounds are specified. In this case, the maximum and minimum absolute capabilities, $Q_{absoluteMAX}$ and $Q_{absoluteMIN}$, are calculated using the following calculations:

$$Q_{absoluteMAX} = \left([P_X - P_{C1}]\frac{Q_{RMAX} - Q_{MAX}}{P_R - P_{C1}}\right) + Q_{MAX}$$

$$Q_{absoluteMIN} = \left([P_X - P_{C2}]\frac{Q_{RMIN} - Q_{MIN}}{P_R - P_{C2}}\right) + Q_{MIN}$$

For this type of WPP, the region below $P_i$ relates to the STAR configuration of the armature winding. In this configuration, the reactive power capability is limited at all times, and so there is no need to consider this region.

It will be appreciated that the charts 320, 340 shown in FIGS. 6 and 7 are provided as examples only, and that different limits may be calculated based upon different configurations of an armature winding of the WTG 14, based upon different types of WTG 14, or based on different conditions.

Figure 8:
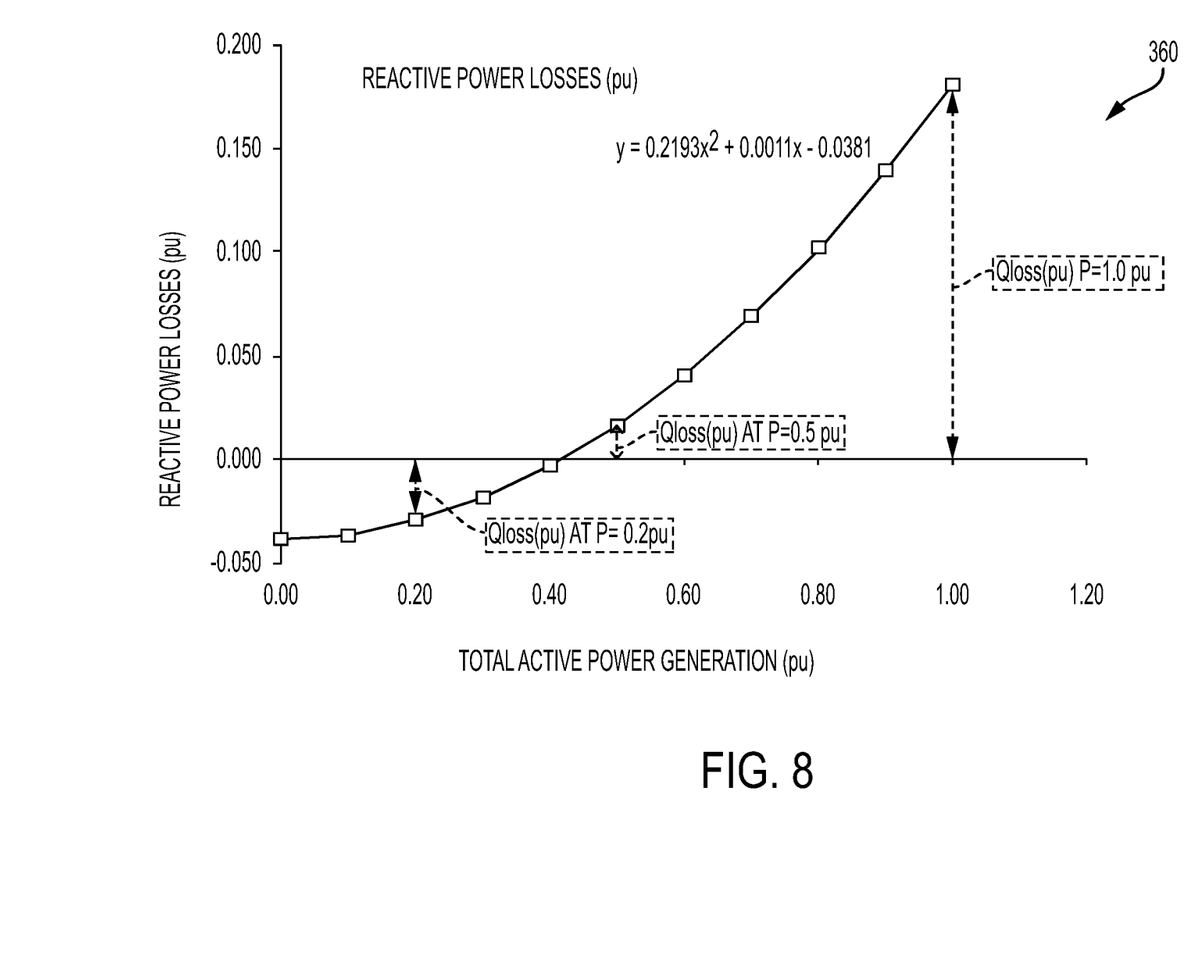
FIG. 8 is a chart outlining a typical relationship between active power generation and reactive power losses in a power network.

Now considering step 308, the losses introduced by the system 10 can be calculated based on the generated active power output of the WPP and a second order polynomial curve such as that shown in the chart 360 of FIG. 8. As shown in the chart 360 of FIG. 8, the reactive power losses increase with active power generation. The losses will be specific to each individual system, and can be derived from data collected from the network during normal operation. To ensure that the losses correspond to the immediate operation of the network, the polynomial may be altered based upon sampled measurements. It is envisaged that the collector losses will be recalculated at regular intervals based upon sampling of the active power output of the WPP 12 at the PoI 26 over a predetermined sampling period.

The effect of compensation equipment, such as that shown in FIG. 1, may also be taken into consideration when calculating the losses.

The determination 310 of the actual, available capability is performed by subtracting the calculated losses from each of the determined absolute capability levels.

It will be appreciated that the above limits, and other limits made use of in the ancillary mode, are dynamic limits that are calculated repeatedly over sample periods to ensure that the values obtained for each reactive power limit level are the highest possible limit.

Returning now to FIG. 3, the reactive power exchange limit is also determined 106 in this initial step 102. A flow chart illustrating a method 400 governing the determination 106 of reactive power exchange limit at the PoI 26 is shown in FIG. 9, and will now be discussed.

Initially, the active power output level of the WPP 12 at the PoI 26 is measured 402. This allows the correct reactive power exchange data to be considered, and the correct limit to be identified. Having measured 402 the active power output level of the WPP 12 at the PoI 26, the correct limit can be calculated, based on a generated so-called 'U-Q' charts or U-Q data structures. So, the method 400 initially comprises measurement 402 of active power output level of the WPP 12, and is followed by generation 404 of a relevant U-Q chart.

At the next step 406 of the method 400 following generation 404 of the U-Q chart, the reference reactive power level is used to identify 408 whether the absorption or supply of reactive power is being requested by the TSO 36. The voltage level of the grid is measured 410 at the same time or subsequently. These measurements are performed to identify the correct quadrant of the U-Q chart from which the correct limits can be identified as will be discussed below.

Finally, the relevant reactive power limit level can be determined 412 by comparison with the limits already specified.

Figure 10:
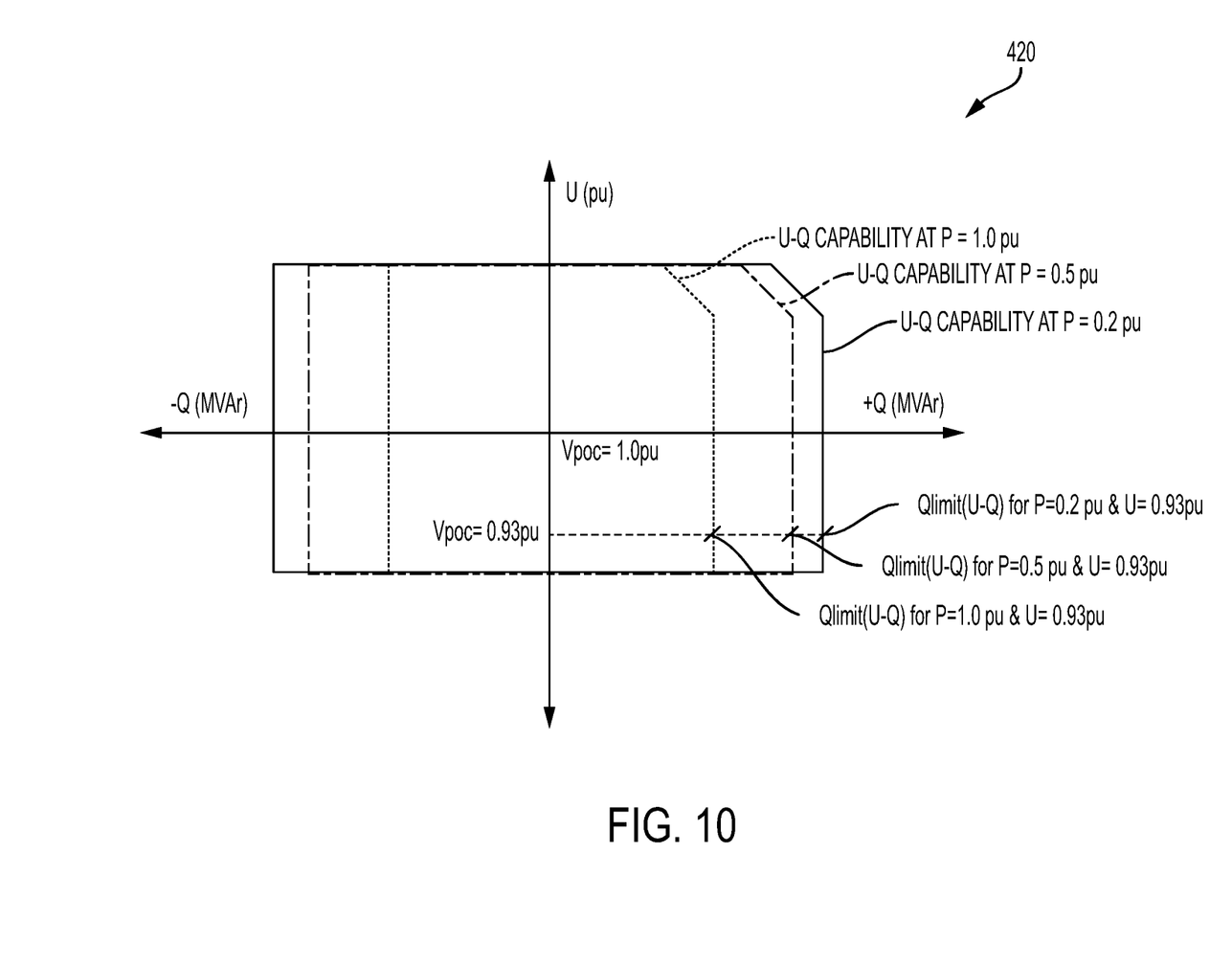
FIG. 10 is a chart outlining the dynamic relationship between voltage and reactive power exchange limits as implemented by a power plant controller according to an embodiment of the invention.

An example of a typical U-Q chart 420 is shown in FIG. 10, which shows reactive power exchange (Q) limits with respect to measured grid voltage (U), the limits being specified for three different active power output levels. The innermost limits correspond to an active power output level of 1.0 pu, the middle limits correspond to an active power output level of 0.5 pu, and the outermost limits correspond to an active power output level of 0.2 pu.

Reactive power levels, Q, are shown on the X axis of the chart 420 of FIG. 10, while voltage levels, U, are shown on the Y axis.

The voltage boundary values $U_{max}$ and $U_{max}$ correspond to respective maximum and minimum reactive power levels at which the WPP 12 may operate, and in this case correspond to 1.1 per-unit voltage (pu) and 0.9 pu respectively. The origin, $U_0$ corresponds to the base voltage 1.0 pu which is the nominal grid voltage.

As can be seen, at all voltages between $U_{max}$ and $U_{min}$, a range of reactive power levels can be demanded by the PPC 32, and the envelope extends to maximum reactive power boundary values $Q_{max}$ and $Q_{min}$. At reactive power levels close to it can be seen that the allowable maximum voltage level falls slightly. This is to ensure that the WTG 14 is always operating within a safe operational range and that high reactive power levels are not demanded when grid voltage level is close to 1.1 pu.

Considering FIGS. 9 and 10, it could be considered that the method 400 of FIG. 9 seeks to identify the quadrant of the U-Q chart 420 of FIG. 10 in which the measured voltage and reactive power reference value lie, and therefore which reactive power limit should be used.

The method 400 first measures 402 active power level to generate 404 the correct U-Q chart and then identifies 410, 408 the voltage level of the main grid 16 and whether the reference reactive power value corresponds to absorption of reactive power from the grid 16 or to supply of reactive power to the main grid 16. The voltage level of the main grid 16 is measured at the PoI 26 and then compared with a threshold value. The reference reactive power value is also compared against a threshold value to determine whether it corresponds to absorption or supply of reactive power by the WPP 12 from/to the main grid 16. In this case, the voltage threshold value is 1.0 pu, while the reactive power threshold value is 0, or no reactive power exchange. A limit value is then calculated 412.

For a high measured grid voltage, e.g. between 1.0 pu and 1.1 pu in the chart 420 of FIG. 10, and for a reference reactive power value that corresponds to supply of reactive power to the main grid 16 by the WPP 12, the reactive power limit is calculated according to the limits shown in the relevant U-Q chart, which can be seen in the first quadrant of the chart of FIG. 10.

The quadrants will be labelled according to the conventional Cartesian coordinate system: the top right quadrant being the first quadrant (I) and the top left quadrant being the second quadrant (II), while the third and fourth quadrants (III, IV) correspond to the lower left and right quadrants respectively.

For a high measured grid voltage, e.g. between 1.0 pu and 1.1 pu in the chart 420 of FIG. 10, and for a reference reactive power value that corresponds to absorption of reactive power by the WPP 12 from the grid 16, the reactive power limit is calculated, by the method 400 in FIG. 9, as a limit shown in the second quadrant of the U-Q chart.

For low measured grid voltage, e.g. between 0.9 pu and 1.0 pu in the chart 420 of FIG. 10, and for a reference reactive power value that corresponds to absorption of reactive power by the WPP 12 from the grid 16, the reactive power limit is calculated as being in the third quadrant of FIG. 10.

Finally, for low measured grid voltage, e.g. between 0.9 pu and 1.0 pu in the chart 420 of FIG. 10, and for a reference reactive power value that corresponds to supply of reactive power to the main grid 16 by the WPP 12, the reactive power limit calculated as being in the fourth quadrant of the U-Q chart.

It will be appreciated that the U-Q chart 420 shown in FIG. 10 is for example only and that any U-Q chart may be used based upon the grid requirements or the operational circumstances of the system.

Returning now to FIG. 3, in the next step of the method 100 of FIG. 3, values for the dynamic reactive power limit level and the dynamic reactive power capability are compared 108, the limit level and capability having been determined 104, 106 as described above for the measured voltage, active power and reactive power levels.

The comparison 108 is performed to establish which of the limit level or the capability is the lowest. By calculating the minimum of the two values, the WPP 12 is operated at a safe level at all times, whilst maximising the potential reactive power output level. As limit and capability levels are calculated dynamically, the minimum of the two values is likely to be higher than limits specified during operation of the PPC 32 and WPP 12 in normal modes.

The result of the comparison 108 is a single limit value, $Q_{limit}$, which is then provided to the PPC processing module 38. The processing module 38 calculates new reference levels for reactive power that each WTG 14 of the WPP 12 should be controlled to meet, and these levels are dispatched 112 to each of the WTGs 14 individually.

The method 100 is repeated over short sample periods, for example 10 s or 30 s, to dynamically alter the capabilities of the WPP 12 and to enhance reactive power exchange.

In some embodiments of the process shown in FIG. 3, the processing module 38 may calculate a single reference level for the WPP 12, which it then communicates to a separate controller or to each of the WTGs 14.

Although the system is depicted here as applying to a wind power plant 12, it is possible to apply the system to any other form of renewable energy power plant such as a photovoltaic power plant.

Many modifications may be made to the above examples without departing from the scope of the present invention as defined in the accompanying claims.

The invention claimed is:

1. A method for controlling a renewable energy power plant comprising a plurality of renewable energy generators connected with a grid through a power transmission network, the method comprising:
   determining a reactive power capability value of the power plant based on a generated active power of each of the plurality of renewable energy generators;
   determining a voltage level associated with the power transmission network;
   determining, using a U-Q data structure specifying reactive power limit levels for predetermined voltage levels, a reactive power exchange limit value for the voltage level; and
   controlling the plurality of renewable energy generators such that the generated reactive power of the power plant does not exceed the lesser of the determined reactive power capability value and the determined reactive power exchange limit value.

2. The method of claim 1, wherein the voltage level is associated with a point of interconnection between the power transmission network and the power plant.

3. The method of claim 1, further comprising:
   determining an active power output level of the power plant; and generating the U-Q data structure based on the determined active power output level.

4. The method of claim 1, wherein controlling the plurality of renewable energy generators comprises:
receiving a global reactive power reference from a transmission system operator;
comparing the global reactive power reference with the lesser of the determined reactive power capability value and the determined reactive power exchange limit value; and
distributing individual reactive power references to each of the plurality of renewable energy generators.

5. The method of claim 4, wherein one or more of determining the reactive power exchange limit value and the reactive power capability value comprises:
identifying whether the global reactive power reference corresponds to absorption or supply of reactive power by the power plant.

6. The method of claim 1, wherein determining the reactive power capability value and determining the reactive power exchange limit value are triggered by a request to participate in ancillary service provision to the grid.

7. The method of claim 1, wherein the plurality of renewable energy generators comprise one or both of: wind turbine generators and photovoltaic generators.

8. A method for controlling a renewable energy power plant comprising a plurality of renewable energy generators connected with a grid through a power transmission network, the method comprising:
determining a reactive power capability value of the power plant based on a generated active power of each of the plurality of renewable energy generators, wherein determining the reactive power capability value of the power plant comprises:
determining a difference between an absolute reactive power capability value of the power plant and network losses associated with the power plant;
determining a reactive power exchange limit value based on a measured voltage level of the grid; and
controlling the plurality of renewable energy generators such that the generated reactive power of the power plant does not exceed the lesser of the determined reactive power capability value and the determined reactive power exchange limit value.

9. The method of claim 8, wherein determining the reactive power capability value of the power plant further comprises:
determining the absolute reactive power capability value of the power plant by reference to a P-Q data structure that specifies reactive power limit levels for predetermined active power levels.

10. The method of claim 9, wherein determining the reactive power capability value of the power plant further comprises:
generating the P-Q data structure based on a real-time voltage measurement at the terminals of at least a respective one of the plurality of renewable energy generators of the power plant.

11. The method of claim 8, wherein determining the reactive power capability value of the power plant further comprises:
determining the network losses by generating a second-order polynomial equation based on the generated active power of the power plant.

12. A power plant controller for a power plant connected with a grid through a power transmission network, the power plant having a plurality of renewable energy generators and reactive power compensation equipment, wherein the power plant controller comprises:
a processor;
an input/output system; and
a memory that includes a set of program code instructions, which when executed by the processor, performs an operation comprising:
determining a reactive power capability value of the power plant based on a generated active power of each of the plurality of renewable energy generators;
determining a voltage level associated with the power transmission network;
determining, using a U-Q data structure specifying reactive power limit levels for predetermined voltage levels, a reactive power exchange limit value for the voltage level; and
controlling the plurality of renewable energy generators and the reactive power compensation equipment such that the generated reactive power of the power plant does not exceed the lesser of the determined reactive power capability value and the determined reactive power exchange limit value.

13. The power plant controller of claim 12, wherein the voltage level is associated with a point of interconnection between the power transmission network and the power plant.

14. The power plant controller of claim 12, wherein determining the reactive power capability value of the power plant comprises:
determining a difference between an absolute reactive power capability value of the power plant and network losses associated with the power plant.

15. The power plant controller of claim 14, wherein determining the reactive power capability value of the power plant further comprises:
determining the absolute reactive power capability value of the power plant by reference to a P-Q data structure that specifies reactive power limit levels for predetermined active power levels.

16. The power plant controller of claim 15, wherein determining the reactive power capability value of the power plant further comprises:
generating the P-Q data structure based on a real-time voltage measurement at the terminals of at least a respective one of the plurality of renewable energy generators of the power plant.

17. The power plant controller of claim 12, wherein the operation further comprises:
determining an active power output level of the power plant; and
generating the U-Q data structure based on the determined active power output level.

18. The power plant controller of claim 12, wherein controlling the plurality of renewable energy generators comprises:
receiving a global reactive power reference from a transmission system operator;
comparing the global reactive power reference with the lesser of the determined reactive power capability value and the determined reactive power exchange limit value; and
distributing individual reactive power references to each of the plurality of renewable energy generators.

19. The power plant controller of claim 12, wherein determining the reactive power capability value and determining the reactive power exchange limit value are triggered by a request to participate in ancillary service provision to the grid.

20. A computer program product stored on a non-transitory machine-readable medium, the computer program product comprising program code instructions for performing an operation, comprising:

determining a reactive power capability value of a power plant based on a generated active power of each of a plurality of renewable energy generators of the power plant, wherein the plurality of renewable energy generators are connected with a grid through a power transmission network;

determining a voltage level associated with the power transmission network;

determining, using a U-Q data structure specifying reactive power limit levels for predetermined voltage levels, a reactive power exchange limit value for the voltage level; and controlling the plurality of renewable energy generators such that the generated reactive power of the power plant does not exceed the lesser of the determined reactive power capability value and the determined reactive power exchange limit value.

* * * * *